United States Patent
Venkatesan et al.

(10) Patent No.: US 6,998,184 B2
(45) Date of Patent: Feb. 14, 2006

(54) HYBRID FUEL CELL

(75) Inventors: Srinivasan Venkatesan, Southfield, MI (US); Stanford R. Ovshinsky, Bloomfield Hills, MI (US); Boyko Aladjov, Rochester Hills, MI (US); Hong Wang, Troy, MI (US); Zdravko Menjak, Troy, MI (US); Subhash K. Dhar, Bloomfield, MI (US)

(73) Assignee: Texaco Ovonic Fuel Cell, LLC, Rochester Hills, MI (US)

( * ) Notice: Subject to any disclaimer, the term of this patent is extended or adjusted under 35 U.S.C. 154(b) by 268 days.

(21) Appl. No.: 10/636,152

(22) Filed: Aug. 7, 2003

(65) Prior Publication Data

US 2005/0031911 A1   Feb. 10, 2005

(51) Int. Cl.
*H01M 12/00*   (2006.01)
*H01M 8/18*    (2006.01)
*H01M 8/04*    (2006.01)

(52) U.S. Cl. .............................. 429/9; 429/27; 429/44; 429/218.2; 429/218.1; 429/223; 429/231.6; 429/19; 429/21; 429/17; 429/224; 429/229

(58) Field of Classification Search .................. 429/9, 429/27, 44, 218.2, 218.1, 223, 231.6, 19, 429/21, 17, 224, 229
See application file for complete search history.

(56) References Cited

U.S. PATENT DOCUMENTS

| | | | | |
|---|---|---|---|---|
| 3,532,548 | A | * | 10/1970 | Zbigniew ...................... 429/21 |
| 6,447,942 | B1 | * | 9/2002 | Ovshinsky et al. ............ 429/27 |
| 6,620,539 | B2 | | 9/2003 | Ovshinsky et al. |
| 2003/0059664 | A1 | * | 3/2003 | Menjak et al. ................. 429/34 |
| 2003/0180584 | A1 | * | 9/2003 | Suzuki et al. .................. 429/9 |
| 2004/0248005 | A1 | * | 12/2004 | Ovshinsky et al. ....... 429/218.2 |

FOREIGN PATENT DOCUMENTS

RU   2204183   10/2003

\* cited by examiner

*Primary Examiner*—Patrick Joseph Ryan
*Assistant Examiner*—Angela J. Martin
(74) *Attorney, Agent, or Firm*—Frederick W. Mau, II; Marvin S. Siskind (57) ABSTRACT

A hybrid fuel cell/battery including at least one cathode, at least one anode, and at least one auxiliary electrode. The auxiliary electrode works in combination with the anode to provide a current as a rechargeable battery while the anode and cathode work in combination to provide an electrical current as a fuel cell. The cathode and the auxiliary electrode may operate alone or in tandem to provide an electrical current.

23 Claims, 7 Drawing Sheets

HYBRID FUEL CELL

FIELD OF THE INVENTION

The present invention generally relates to fuel cells. More particularly, the present invention relates to fuel cells having a built-in battery used to supplement the power output of the fuel cell and provide instant start-up.

BACKGROUND

As the world's population expands and its economy increases, the increase in the atmospheric concentrations of carbon dioxide is warming the earth causing climate changes. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations. Furthermore, fluctuating energy costs are a source of economic instability worldwide In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention is another product which is essential to shortening that period to a matter of years. In the near term, hydrogen will be used in fuel cells for cars, trucks and industrial plants, just as it already provides power for orbiting spacecraft. But, with the problems of storage and infrastructure solved (see U.S. application Ser. No. 09/444,810, entitled "A Hydrogen-based Ecosystem" filed on Nov. 22, 1999 for Ovshinsky, et al., which is herein incorporated by reference and U.S. patent application Ser. No. 09/435,497, entitled "High Storage Capacity Alloys Enabling a Hydrogen-based Ecosystem", filed on Nov. 6, 1999 for Ovshinsky et al., which is herein incorporated by reference), hydrogen will also provide a general carbon-free fuel to cover all fuel needs.

Hydrogen is the "ultimate fuel." In fact, it is considered to be "THE" fuel for the future. Hydrogen is the most plentiful element in the universe (over 95%). Hydrogen can provide an inexhaustible, clean source of energy for our planet which can be produced by various processes. Utilizing the inventions of subject assignee, the hydrogen can be stored and transported in solid state form in trucks, trains, boats, barges, etc. (see the '810 and '497 applications).

A fuel cell is an energy-conversion device that directly converts the energy of a supplied gas into an electric energy. Researchers have been actively studying fuel cells to utilize the fuel cell's potential high energy-generation efficiency. The base unit of the fuel cell is a cell having an oxygen electrode, a hydrogen electrode, and an appropriate electrolyte. Fuel cells have many potential applications such as supplying power for transportation vehicles, replacing steam turbines and power supply applications of all sorts. Despite their seeming simplicity, many problems have prevented the widespread usage of fuel cells.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical fuel cell are the hydrogen electrode for hydrogen oxidation and the oxygen electrode for oxygen reduction, both being positioned in a cell containing an electrolyte (such as an alkaline electrolytic solution). Typically, the reactants, such as hydrogen and oxygen, are respectively fed through a porous hydrogen electrode and oxygen electrode and brought into surface contact with the electrolyte. The particular materials utilized for the hydrogen electrode and oxygen electrode are important since they must act as efficient catalysts for the reactions taking place.

In a hydrogen-oxygen alkaline fuel cell, the reaction at the hydrogen electrode occurs between hydrogen fuel and hydroxyl ions ($OH^-$) present in the electrolyte, which react to form water and release electrons:

$$H_2 + 2OH^- \rightarrow 2H_2O + 2e^-.$$

At the oxygen electrode, oxygen, water, and electrons react in the presence of the oxygen electrode catalyst to reduce the oxygen and form hydroxyl ions ($OH^-$):

$$O_2 + 2H_2O + 4e^- \rightarrow 4OH^-.$$

The flow of electrons is utilized to provide electrical energy for a load externally connected to the hydrogen and oxygen electrodes.

The catalyst in the hydrogen electrode of the alkaline fuel cell has to not only split molecular hydrogen to atomic hydrogen, but also oxidize the atomic hydrogen to release electrons. The overall reaction can be seen as (where M is the catalyst):

$$M + H_2 \rightarrow 2MH \rightarrow M + 2H^+ + 2e^-.$$

Thus the hydrogen electrode catalyst must efficiently dissociate molecular hydrogen into atomic hydrogen. Using conventional hydrogen electrode material, the dissociated hydrogen atoms are transitional and the hydrogen atoms can easily recombine to form molecular hydrogen if they are not used very quickly in the oxidation reaction.

In a zinc-air fuel cell, a type of metal-air fuel cell, the reaction at the anode occurs between the zinc contained in the anode and hydroxyl ions ($OH^-$) present in the electrolyte, which react to release electrons:

$$Zn \rightarrow Zn^{+2} + 2e^-$$

At the cathode, oxygen, water, and electrons react in the presence of the oxygen electrode catalyst to reduce the oxygen and form hydroxyl ions ($OH^-$):

$$O_2 + 2H_2O + 4e^- \rightarrow 4OH^-.$$

The flow of electrons is utilized to provide electrical energy for a load externally connected to the hydrogen and oxygen electrodes.

Fuel cells, when used to power vehicles, are often used with an auxiliary battery pack because of the general inability of fuel cells to provide power instantly upon start-up or provide increased bursts of power for sudden acceleration. Such vehicles are generally termed hybrid electric vehicles (HEV). The auxiliary battery supplements the fuel cell power output during conditions requiring high power output, such as during start-up or sudden acceleration. PEM fuel cells do not work very well at low temperatures owing to the increase in the membrane resistance within the fuel cell at lower temperatures. In addition, the normal start up time required for the PEM cell even at ambient temperatures is quite significant making instant start difficult. Unlike PEM fuel cells, alkaline fuel cells are able to operate at ambient temperatures, since they do not use any membranes and the electrolyte does not freeze at temperatures above −60° C. Alkaline fuel cells, however, still require the use of a battery during instant start-up and sudden acceleration.

Hybrid systems have been divided into two broad categories, namely series and parallel systems. In a typical series system, a battery powers an electric propulsion motor which is used to drive a vehicle and an internal combustion engine is used to recharge the battery. In a parallel system, both the internal combustion engine and the battery power in conjunction with an electric motor can be used, either separately or together, to power a vehicle. In these types of vehicles, the battery is usually used only in short bursts to provide increased power upon demand after which the battery is recharged using the internal combustion engine or via feedback from a regenerative braking process.

There are further variations within these two broad categories. One variation is made between systems which are "charge depleting" in the one case and "charge sustaining" in another case. In the charge depleting system, the battery charge is gradually depleted during use of the system and the battery thus has to be recharged periodically from an external power source, such as by means of connection to public utility power. In the charge sustaining system, the battery is recharged during use in the vehicle, through regenerative braking and also by means of electric power supplied from the a generator powered by the internal combustion engine so that the charge of the battery is maintained during operation.

There are many different types of systems that fall within the categories of "charge depleting" and "charge sustaining" and there are thus a number of variations within the foregoing examples which have been simplified for purposes of a general explanation of the different types. However, it is to be noted in general that systems which are of the "charge depleting" type typically require a battery which has a higher charge capacity (and thus a higher specific energy) than those which are of the "charge sustaining" type if a commercially acceptable driving range (miles between recharge) is to be attained in operation.

A key enabling technology for HEVs is having an energy storage system having a high energy density while at the same time being capable of providing very high power. Such a system allows for recapture of energy from braking currents at very high efficiency while enabling the design of a smaller battery pack.

A typical auxiliary battery pack as used in HEV applications is a nickel metal hydride battery pack. In general, nickel-metal hydride (Ni—MH) cells utilize a negative electrode comprising a metal hydride active material that is capable of the reversible electrochemical storage of hydrogen. Examples of metal hydride materials are provided in U.S. Pat. Nos. 4,551,400, 4,728,586, and 5,536,591 the disclosures of which are incorporated by reference herein. The positive electrode of the nickel-metal hydride cell comprises a nickel hydroxide active material. The negative and positive electrodes are spaced apart in the alkaline electrolyte.

Upon application of an electrical current across a Ni—MH cell, the Ni—MH material of the negative electrode is charged by the absorption of hydrogen formed by electrochemical water discharge reaction and the electrochemical generation of hydroxyl ions:

$$M + H_2O + e^- \underset{discharge}{\overset{charge}{\longleftrightarrow}} MH + OH^- \quad (1)$$

The negative electrode reactions are reversible. Upon discharge, the stored hydrogen is released to form a water molecule and release an electron.

The charging process for a nickel hydroxide positive electrode in an alkaline electrochemical cell is governed by the following reaction:

$$Ni(OH)_2 + OH^- \underset{discharge}{\overset{charge}{\longleftrightarrow}} NiOOH + H_2O + e^- \quad (2)$$

After the first charge of the electrochemical cell, the nickel hydroxide is oxidized to form nickel oxyhydroxide. During discharge of the electrochemical cell, the nickel oxyhydroxide is reduced to form beta nickel hydroxide as shown by the following reaction:

$$NiOOH + H_2O + e^- \underset{charge}{\overset{discharge}{\longleftrightarrow}} Ni(OH)_2 + OH^-. \quad (3)$$

While the inclusion of an auxiliary battery pack working in conjunction with a fuel cell has many advantages for powering vehicles, such systems still have disadvantages upon implementation in a vehicle. The disadvantages of including a battery along with the fuel cell may include increased weight, space, terminals, inter cell connects, cost, maintenance, etc. Improvements in these areas will help fuel cells to become the standard source of power for vehicles and many other applications.

SUMMARY OF THE INVENTION

The present invention discloses a hybrid fuel cell comprising a fuel cell portion and a rechargeable battery portion both being disposed in a given enclosure. The fuel cell portion and the rechargeable battery portion are adapted to operate alone or in tandem to provide power. The fuel cell portion and the rechargeable battery portion may share at least one reactant. Such reactants may include hydrogen, oxygen, or the metal as used in the anode in a metal-air fuel cell. The hybrid fuel cell further comprises an anode section including one or more anodes disposed between the fuel cell portion and the rechargeable battery portion. The anode section may be shared between the fuel cell portion and the rechargeable battery portion.

The anode may be comprised of an anode active material including zinc, cadmium, magnesium, or aluminum. The anode may comprise 90 to 99 weight percent of the anode active material and. 1 to 10 weight percent of a binder material. The anode may also include a hydrogen storage material and/or Raney nickel. When including a hydrogen storage alloy and/or Raney nickel, the anode may comprise 0.0 to 88.0 weight percent of the hydrogen storage material, 0.0 to 88.0 weight percent Raney nickel, 4.0 to 12.0 weight percent of a binder material, and 0.0 to 5.0 weight percent of a conductive material. Where more than one anodes are included in the anode section, the composition of the anodes may vary as needed. The conductive material may be comprised of graphite or graphitized carbon and the hydrogen storage material may be comprised of Rare-earth metal alloys, Misch metal alloys, zirconium alloys, titanium alloys, magnesium/nickel alloys, or mixtures thereof.

The fuel cell portion of the hybrid fuel cell comprises at least one cathode in electrical communication with the anode. The cathode may comprise a carbon matrix with an active catalyst material catalytic toward the dissociation of molecular oxygen dispersed therein. The active catalyst material may be selected from silver, silver alloys, silver oxide, cobalt, cobalt oxide, cobalt manganese oxide, nickel, manganese oxide, manganese dioxide, pyrolyzed macrocyclics, or combinations thereof. The cathode may further include a peroxide decomposing material.

The rechargeable battery portion comprises at least one auxiliary electrode in electrical communication with the anode. The auxiliary electrode may be a nickel electrode or a silver electrode. The auxiliary electrode comprises a positive electrode material. The positive electrode material may comprise 75 to 85 weight percent of a positive electrode active material, 0.0 to 10 weight percent cobalt, 0.0 to 10 weight percent cobalt oxide, and 0.0 to 4.0 weight percent of a binder material. The positive electrode active material may be selected from nickel hydroxide/nickel oxyhydroxide, copper oxide, silver oxide, manganese dioxide, or combinations thereof.

The rechargeable battery portion may be adapted to accept an electrical current from the fuel cell portion or a source of power external to the hybrid fuel cell. The fuel cell portion and the rechargeable battery portion may also share an electrolyte.

DETAILED DESCRIPTION OF THE PREFERRED EMBODIMENTS OF THE INVENTION

The present invention discloses a hybrid fuel cell with an insitu rechargeable battery which can operate in 1) a fuel cell mode, 2) a rechargeable battery mode, and 3) a hybrid mode which operates as a combined fuel cell/rechargeable battery. The hybrid fuel cell in accordance with the present invention provides for power generation via a fuel cell with the capability of supplementing the power produced from the fuel cell as needed with a built-in rechargeable battery. The hybrid fuel cell may also work solely as a rechargeable battery as needed. In vehicle applications, the present invention provides for instant start-up capability as well as increased power, which is needed for sudden acceleration. The present invention may also be useful for many other applications requiring an instant source of power.

The hybrid fuel cell generally comprises one or more electrochemical cell units connected in series. The number of electrochemical cell units within the hybrid fuel cell may be varied as needed to provide the desired power output. Fuel cells composed of multiple electrochemical cell units are described in U.S. patent application Ser. No. 10/609,553, entitled "Air Breathing Fuel Cell Having Bi-cell Unit Cells", filed on Aug. 28, 2003 for Menjak et al., the disclosure of which is herein incorporated by reference.

Each electrochemical cell unit includes a fuel cell portion and a rechargeable battery portion. The fuel cell portion includes at least one cathode, and the rechargeable battery portion includes at least one auxiliary electrode. The fuel cell portion and the rechargeable battery portion may share at least one reactant such as hydrogen and oxygen. In the case of a metal-air cell, the fuel cell portion and the rechargeable battery portion may share a consumable metal such as zinc, aluminum, cadmium, or magnesium as found in the anode. The fuel cell portion and the battery portion share a common anode section including at least one anode. The cathode in the fuel cell portion and the anode in the anode section work together as a fuel cell, while the auxiliary electrode in the rechargeable battery portion and the anode in the anode section work together as a rechargeable battery. In addition, the cathode in the fuel cell portion and the auxiliary electrode in the rechargeable battery portion may work together with the anode section simultaneously in "hybrid mode" thus providing higher power output. The anodes, cathodes, and auxiliary electrodes are in contact with an electrolyte, which may be in liquid, gel, molten, or solid form. The fuel cell portion and the rechargeable battery portion may also share a common electrolyte.

The anodes, cathodes, and auxiliary electrodes may be disposed within frames in the electrochemical cell units. The frames provide pathways for oxygen, hydrogen, and/or electrolyte to contact the electrodes. The frames may be constructed from any material resistant to the environment within the electrochemical cell units. Examples of framed electrodes can be found in U.S. patent application Ser. No. 10/284,817, entitled "Fuel Cell With Overmolded Electrode Assemblies", filed on Oct. 31, 2002 for Puttaiah et al., the disclosure of which is herein incorporated by reference.

In many fuel cell systems, the fuel cell works in conjunction with an auxiliary battery pack as a hybrid vehicle system. The battery pack provides energy as needed and is recharged with energy from regenerative braking and/or external power sources. The hybrid fuel cell in accordance with the present invention is able to accept energy from regenerative braking and/or external power sources resulting in charging of the rechargeable battery portion. During normal operation, the anode section and cathode in the fuel cell portion work together and function like a fuel cell, but upon increased power requirements, such as during acceleration when used to power a vehicle, the anode section is able to work with the cathode in the fuel cell portion as a fuel cell while working with the auxiliary electrode in the rechargeable battery portion as a rechargeable battery thereby providing instant high power output through an increase in current density and/or a decrease in polarization. The rechargeable battery portion may also work alone with the anode section to provide power. The capability of the rechargeable battery portion to work alone is especially useful in vehicle applications for instant startup.

The fuel cell portion of the electrochemical cell units in accordance with the present invention may be designed to operate as an hydrogen-oxygen alkaline fuel cell, a metal-air fuel cell, a PEM fuel cell, a direct methanol fuel cell, a molten carbonate fuel cell, a solid oxide fuel cell, or a phosphoric acid fuel cell, provided that all of the electrodes including the auxiliary electrode in the rechargeable battery portion are compatible with the working conditions, and the appropriate electrolyte and temperatures are selected. Preferably, the fuel cell portion of the electrochemical cell units operate as a hydrogen-oxygen alkaline fuel cell or metal-air cell.

Figure 1:
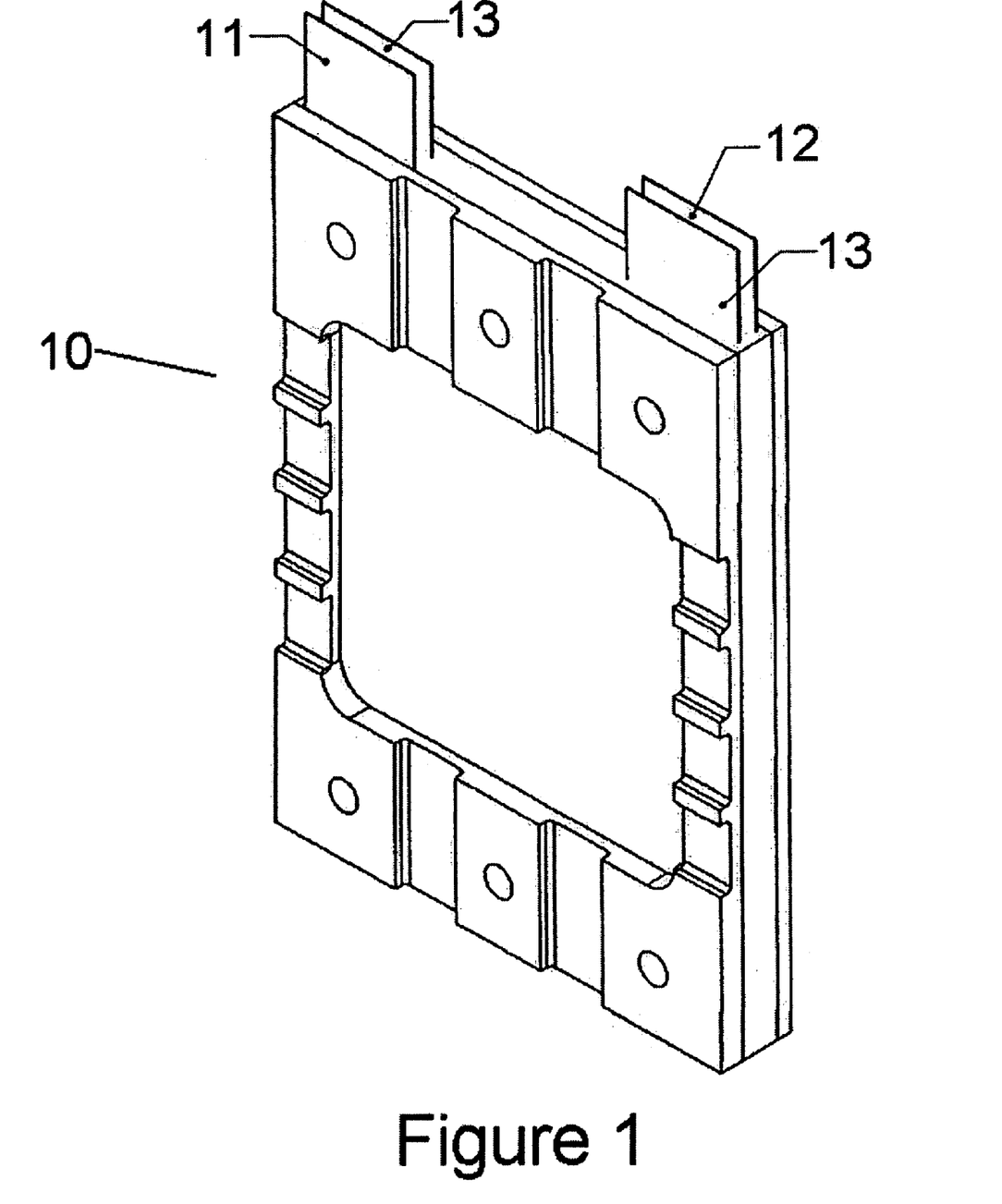
FIG. 1, shows an embodiment of a hydrogen-oxygen alkaline electrochemical cell unit in accordance with the present invention.
Figure 2:
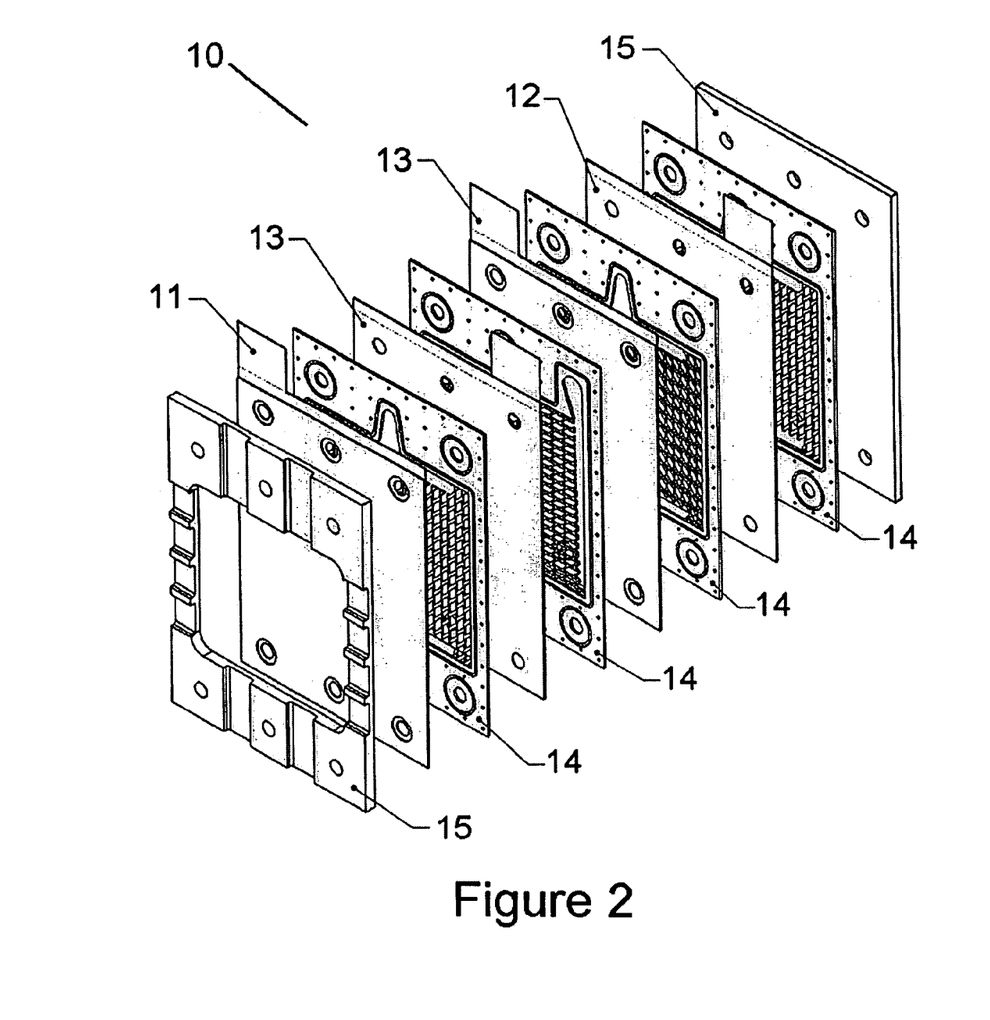
FIG. 2, shows an exploded view of the electrochemical cell unit depicted in FIG. 1.

A first embodiment of an electrochemical cell unit 10 in accordance with the present invention is shown in FIG. 1 and FIG. 2. The electrochemical cell unit operates as a hybrid hydrogen-oxygen alkaline fuel cell/rechargeable battery. The electrochemical cell unit includes a fuel cell portion including one cathode 11 having an oxygen interface and an electrolyte interface, and a rechargeable battery portion including one auxiliary electrode 12 at least partially immersed in an electrolyte. The fuel cell portion and the rechargeable battery portion share an anode section including two anodes 13 each having a hydrogen interface and an electrolyte interface. Oxygen or an oxygen containing stream is supplied to the oxygen interface of the cathode 11 in the fuel cell portion and hydrogen is supplied to the hydrogen interface of the anodes 13 in the anode section. Hydrogen enters or is absorbed by the anodes 13 through the hydrogen interface and reacts with the electrolyte at the electrolyte interface of the anode to form water and electrons. Oxygen enters the oxygen interface of the cathode 11, is dissociated into atomic oxygen, and reacts electrochemically to form hydroxyl ions at the electrolyte interface of the cathode 11. The electrons flowing from the anode to the cathode form the electrical current supplied to the desired application. When a sudden surge of additional power is needed, electrical current may be supplied from the rechargeable battery portion. The auxiliary electrode 12 contained in the rechargeable battery portion works with the anode 13 adjacent to the auxiliary electrode 12 in the anode section to provide an electrical current as needed. The auxiliary electrode is fully charged when it is in its oxidized state. Upon discharge, the auxiliary electrode undergoes reduction thereby providing an electrical current. The electrical current may be used to supplement the current produced by the fuel cell or may be used alone. To recharge the rechargeable battery portion, a current is applied across the anode adjacent to the auxiliary electrode and auxiliary electrode to re-oxidize the auxiliary electrode.

The anodes 13 and cathodes 11 may be designed such that oxygen or hydrogen enters through the edge of the electrode and flows through the electrode, or each electrode may have an oxygen or hydrogen contacting side and an electrolyte contacting side. The electrolyte interfaces of the cathodes and anodes are in constant contact with an electrolyte, while the auxiliary electrode is at least partially submerged in the electrolyte. When the anodes and cathodes having an oxygen or hydrogen interface on one side of the electrode and an electrolyte interface on the opposing side of the electrode, the electrochemical cell should be designed such that the hydrogen or oxygen interfaces of the electrodes remain dry and constantly supplied with hydrogen or oxygen during operation.

To optimize the flow of hydrogen, two anodes may be used in the anode section of electrochemical cell unit. When using two anodes, the anodes may be placed side by side with the hydrogen contacting surfaces of the anodes facing each other forming a hydrogen chamber between the hydrogen contacting surfaces of the anodes. The anode compositions may differ depending upon whether they are designed to operate as the anode of the fuel cell portion or the anode of the rechargeable battery portion. A stream of hydrogen is supplied between the hydrogen electrodes thereby providing hydrogen to the hydrogen contacting sides of the anodes. The cathode 11 is placed across from the electrolyte contacting side of one of the anodes, while the auxiliary electrode 12 is placed across from the electrolyte contacting side of the other anode 13. Distribution plates 14 may be placed between the electrodes to aid in the distribution of electrolyte, hydrogen, or oxygen to the electrodes. The distribution plates 14 may also provide mechanical support within the electrochemical cell unit 10. End plates 15 are typically placed at the ends of each electrochemical cell unit 10. The endplates 15 may be designed such that oxygen is allowed to contact the cathode 11 through the end plate 15. The endplates 15 are designed to provide support to each electrochemical cell unit 10.

Figure 3:
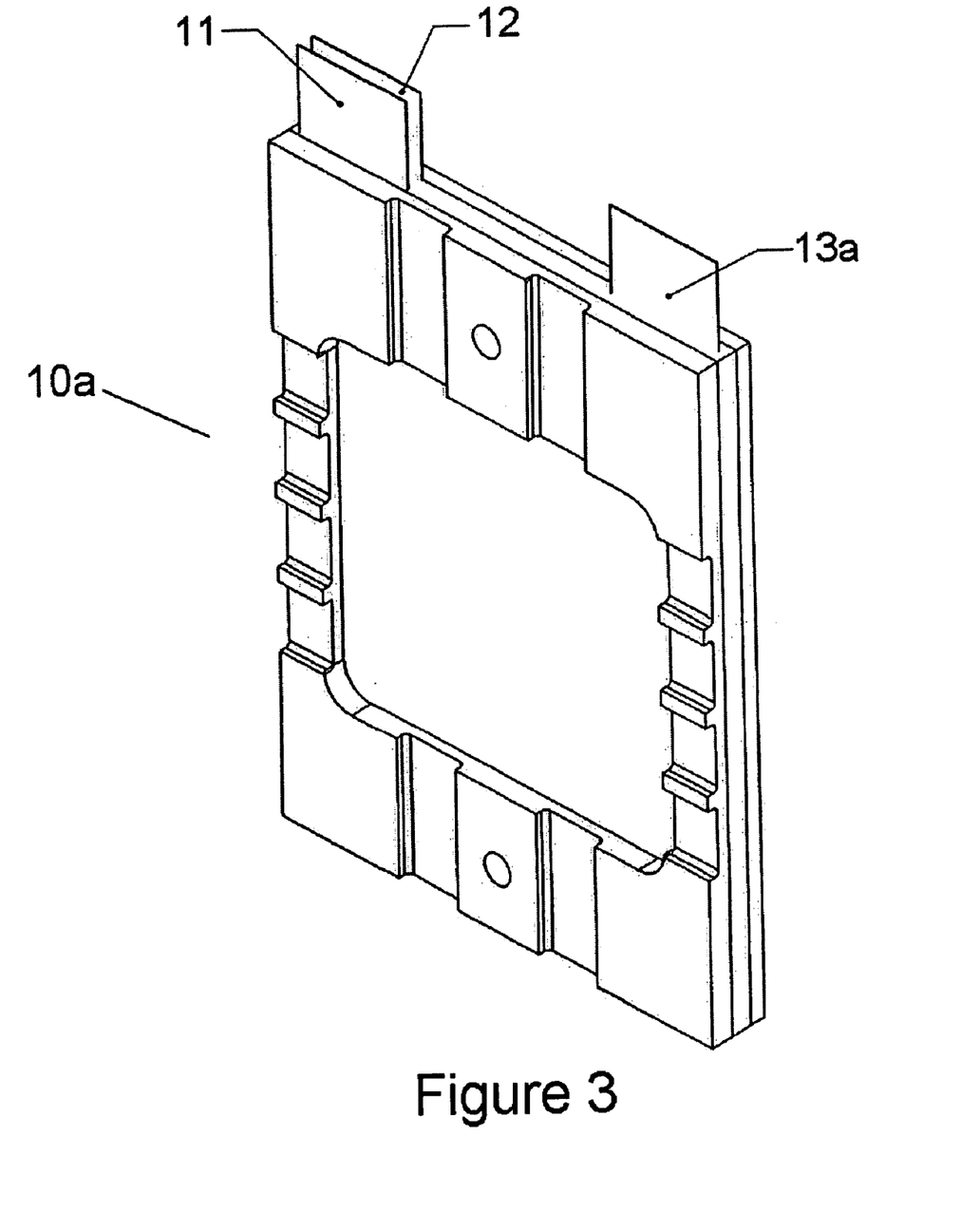
FIG. 3, shows an embodiment of a metal-air alkaline electrochemical cell unit in accordance with the present invention.
Figure 4:
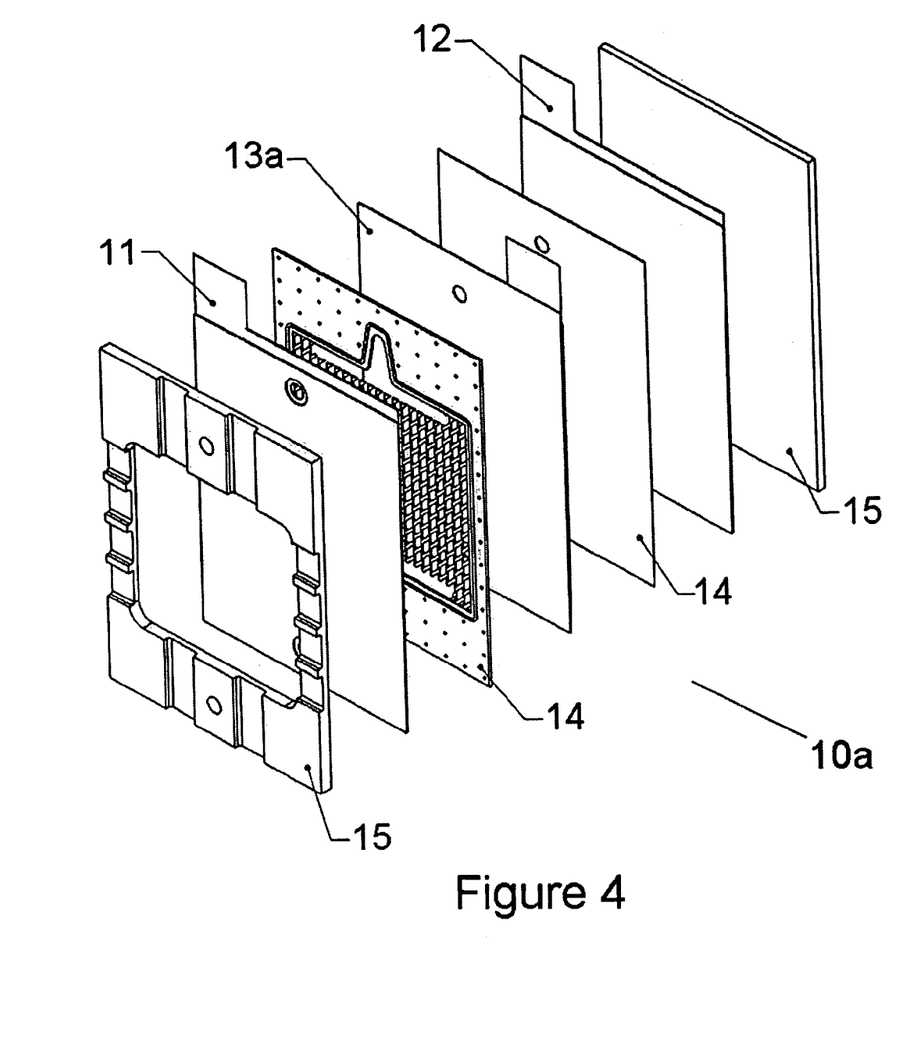
FIG. 4, shows an exploded view of the electrochemical cell unit depicted in FIG. 3.

A second embodiment of an electrochemical cell unit 10a in accordance with the present invention is depicted in FIG. 3 and FIG. 4. The second embodiment operates as a hybrid metal-air fuel cell/rechargeable battery. The second embodiment includes at least one cathode 11 having an oxygen interface and an electrolyte interface, at least one anode 13a, and at least one auxiliary electrode 12. The anode 13a and the auxiliary electrode 12 are at least partially submerged in an alkaline electrolyte solution. Unlike the hybrid hydrogen-oxygen alkaline fuel cell, the anode 13a for the metal-air cell does not need to be supplied with hydrogen. The anode 13a, serving as a solid fuel, is positioned between the cathode and the auxiliary electrode with the electrolyte contacting side of the cathode facing the anode. Oxygen or an oxygen containing stream is fed to the oxygen interface of the cathode 11. Oxygen enters the oxygen interface of the cathode 11, is dissociated into atomic oxygen, and reacts with water and electrons to form hydroxyl ions at the electrolyte interface of the cathode 11. The cathode 11 may be designed such that oxygen enters through the edge of the cathode and flows through the cathode, or each cathode may have an oxygen contacting side and an electrolyte contacting side, with the electrolyte contacting side being in constant contact with an electrolyte. In the case of the cathodes 11 having an oxygen contacting side and an electrolyte contacting side, the electrochemical cell should be designed such that the oxygen contacting sides of the cathodes remain dry and constantly supplied with oxygen during operation. Distribution plates 14 may be placed between the electrodes to aid in the distribution of electrolyte, hydrogen, or oxygen to the electrodes. The distribution plates 14 may also provide mechanical support within the electrochemical cell unit 10a. End plates 15 are typically placed at the ends of each electrochemical cell unit 10a. The endplates 15 may be designed such that oxygen is allowed to contact the cathode 11 through the end plate 15. The endplates 15 are designed to provide support to each electrochemical cell unit 10a.

The anode and cathode of the metal-air fuel cell provide an electrical current resulting from the production of electrons from the oxidation of the anode metal, such as zinc. When additional power is needed, electrical current may be supplied from the auxiliary electrode coupled with the anode. The auxiliary electrode is fully charged when in its oxidized state. Upon discharge, the auxiliary electrode undergoes reduction thereby completing the circuit and providing an electrical current. The electrical current may be used to supplement the current produced by the fuel cell or may be used alone. To recharge the auxiliary electrode as well as the anode, a current is applied across the anode and auxiliary electrode to reoxidize the auxiliary electrode. During reduction of the auxiliary electrode, metal ions contained in the electrolyte solution are reduced and deposited back onto the anode as metal thereby replenishing the zinc used during operation of the metal-air fuel cell. Additives may also be added to the anode or the electrolyte to reduce the formation of dendrites and ensure a smooth uniform metallic plating when the metal is deposited on the anode.

Anodes as used in the hybrid hydrogen-oxygen alkaline fuel cell embodiment of the present invention are generally comprised of an active material supported on a current collector grid. The active material for the anode of the hybrid hydrogen-oxygen alkaline fuel cell may be generally comprised of 0.0 to 88.0 weight percent of a hydrogen storage material, 0.0 to 88.0 weight percent Raney Nickel, 4.0 to 12 weight percent binder material, and 0.0 to 5.0 weight percent graphite or graphitized carbon. The hydrogen storage material may be selected from Rare-earth metal alloys, Misch metal alloys, zirconium alloys, titanium alloys, magnesium/nickel alloys, and mixtures or alloys thereof which may be AB, $AB_2$, or $AB_5$ type alloys. Such alloys may include modifier elements to increase their hydrogen storage capability.

Anodes as used in the hybrid metal-air fuel cell embodiment of the present invention are generally comprised of an active material supported on a current collector grid. The active material for the anode as used in metal-air cells, is typically comprised of zinc, aluminum, magnesium, cadmium, or alloys or combinations thereof. Typically these alloys will contain between 1 to 10 weight percent of indium, bismuth, lead, tin, or mercury. The active material for the anodes as used in the hybrid metal-air fuel cell in accordance with the present invention may be generally comprised of 90 to 99 weight percent of an anode metal, and 1.0 to 10 weight percent binder material. Metals such as cadmium, aluminum, or magnesium may be substituted for zinc.

The binder materials may be any material, which binds the active material together to prevent degradation or disintegration of the electrode/electrode materials during the lifetime of the electrodes. Binder materials should be resistant to the environment present within the electrochemical cell units. This includes high concentration of KOH, dissolved oxygen, dissolved peroxyl ions ($HO_2^-$), etc. Examples of additional binder materials, which may be added to the active composition, include, but are not limited to, polymeric binders such as polyvinyl alcohol (PVA), carboxymethyl cellulose (CMC) and hydroxycarboxymethyl cellulose (HCMC). Other examples of polymeric binders include fluoropolymers. An example of a fluoropolymer is polytetrafluoroethylene (PTFE). Other examples of additional binder materials, which may be added to the active composition, include elastomeric polymers such as styrene-butadiene. In addition, depending upon the application, additional hydrophobic materials and/or electroconductive plastics may also be added to the active composition. An example of an electroconductive polymeric binder material is commercially sold under the name Panipol.

Cathodes as used in hydrogen-oxygen alkaline fuel cells or zinc-air cells are typically comprised of a carbon matrix with a material catalytic toward the dissociation of molecular oxygen into atomic oxygen dispersed therein. Such cathodes may be single or multilayered. A single layered cathode may be comprised of a carbon matrix with an active catalytic material dispersed therein, with the carbon matrix being supported by at least one current collector grid. A multilayered cathode may be composed of an active material layer having a built-in hydrophobic character, a gas diffusion layer having a greater built-in hydrophobic character than the active material layer, and at least one current collector grid. The active material layer and the gas diffusion layer are positioned adjacent to each other and supported by at least one current collector grid. The gas diffusion layer is composed of a teflonated carbon matrix. The teflonated carbon matrix may be comprised of 40% teflonated acetylene black carbon or 60% teflonated Vulcan XC-72 carbon (Trademark of Cabot Corp.). The active material layer of the cathode in accordance with the present invention is composed of carbon particles coated with PTFE. The carbon particles are preferably carbon black particles, such as Black Pearl 2000 (Trademark of Cabot Corp.). The carbon/PTFE black mixture contains approximately 10 to 20 percent PTFE with the remainder being carbon black particles. An active material catalytic toward the dissociation of molecular oxygen into atomic oxygen is dispersed throughout the active material layer. The active catalyst material may be selected from silver metal, silver alloys, silver oxide, cobalt oxide, cobalt manganese oxide, cobalt, nickel, manganese oxides, manganese dioxide, pyrolyzed macrocyclics, or combinations thereof. The active material layer may also include up to 30 weight percent of a peroxide decomposing material. The peroxide decomposing material may be selected from $MnO_2$, MnO, cobalt oxides, nickel oxides, iron oxides, or mixtures thereof.

The active catalyst material may be incorporated into the active material layer by mechanically mixing the active catalyst material with the teflonated carbon prior to forming the electrode, or the active catalyst material may be impregnated into the active material layer after formation of the electrode. To impregnate the active material layer of the cathode with the active catalyst material after electrode formation, the active catalyst material may be chemically or electrochemically impregnated into the active material layer. To chemically or catalytically impregnate the active material layer of the cathode, the cathode is dipped into an aqueous solution of an active catalyst material precursor. The active catalyst material precursor may be a 1M $AgNO_3$ solution containing 10% by weight sugar as a reducing agent. Other precursors such as a $AgNO_3/Ga(NO)_3$ mixture, $AgNO_3/LiNO_3$ mixture, $Co(NO_3)_2$, a cobalt amine complex, $NI(NO_3)_2$, $Mn(NO_3)_2$, cyano complexes, organo metallic complexes, amino complexes, citrate/tartrate/lactate/oxalate complexes, transition metal complexes, transition metal macrocyclics, and mixtures thereof may be substituted for the $AgNO_3$ in the precursor solution. Once submerged in the aqueous active catalyst material precursor solution, the solution may be pulled into the active material layer under vacuum. The varying layers of hydrophobicity between the gas diffusion layer and the active material layer allow the solution to penetrate into the pores within the active material layer and not penetrate into the gas diffusion layer. The active catalyst material is deposited from the aqueous solution in the pores within the active material layer and any air or gases present in the solution pass through the gas diffusion layer. In addition to dipping in the aqueous solution, the impregnation may be performed by spraying or spreading the active catalyst on the electrode surface. After removing the cathode from the active catalyst material solution, the cathode is dried at room temperature. The cathode is then heat treated at 50 degrees Celsius to remove any water from the electrode. The cathode may then be heat treated at 300–375 degrees Celsius for half an hour to decompose any remaining metal nitrates into their corresponding oxides. Temperatures exceeding this range are not employed because the teflon binder will begin to decompose and adversely affect the performance of the electrodes. Depending upon the catalyst used, these oxides may further decompose to produce their parent metal catalysts. To add more catalyst the above process is repeated as necessary. The cathode is then cooled and ready for use. After impregnation, the active catalyst material forms submicron to nano particles of the active catalyst material within the carbon matrix. The auxiliary electrode may be any battery positive electrode capable of withstanding the operating conditions within the electrochemical cell. The auxiliary electrodes may be composed of any positive electrode material supported on a current collector grid. The positive electrode material is generally comprised of 75 to 85 weight percent positive electrode active material, 0.0 to 10 weight percent cobalt, 0.0 to 10 weight percent cobalt oxide, and 0.0 to 4.0 weight percent binder material. The positive electrode active material may be any material that may undergo oxidation upon charging and reduction upon discharging of the electrochemical cell. The positive electrode active material may be selected from nickel hydroxide/nickel oxyhydroxide, copper oxide, silver (I or II) oxide, or manganese dioxide. The binder materials as used in the auxiliary electrode may be any of those listed for the anode and cathode. The auxiliary electrode is recharged by accepting an electrical current from a source of power external to the hybrid fuel cell. The source of power may be supplied from regenerative braking, solar power, a power supply.

The electrodes in accordance with the present invention may be paste-type electrodes or non paste-type electrodes. Non-paste type electrodes may be powder compacted, sintered chemically/electrochemically impregnated, or plastic bonded extruded type. Paste-type electrodes may be formed by applying a paste of the active electrode material onto a conductive substrate, compressing a powdered active electrode material onto a conductive substrate, or by forming a ribbon of the active electrode material and affixing it onto a conductive substrate. The substrate as used in accordance with the present invention may be any electrically conductive support structure that can be used to hold the active composition such as a current collector grid selected from, but not limited to, an electrically conductive mesh, grid, foam, expanded metal, or combinations thereof. The most preferable current collector grid is an electrically conductive mesh having 40 wires per inch horizontally and 20 wires per inch vertically, although other meshes may work equally well. The wires comprising the mesh may have a diameter between 0.005 inches and 0.01 inches, preferably between 0.005 inches and 0.008 inches. This design provides optimal current distribution due to the reduction of the ohmic resistance. Where more than 20 wires per inch are vertically positioned, problems may be encountered when affixing the active material to the substrate. The actual form of the substrate used may depend on whether the substrate is used for the positive or the negative electrode of the electrochemical cell, the type of electrochemical cell (for example, battery or fuel cell), the type of active material used, and whether it is paste type or non-paste type electrode. The conductive substrate may be formed of any electrically conductive material and is preferably formed of a metallic material such as a pure metal or a metal alloy. Examples of materials that may be used include nickel, nickel alloy, copper, copper alloy, nickel-plated metals such as nickel-plated copper and copper-plated nickel. The actual material used for the substrate depends upon many factors including whether the substrate is being used for the positive or negative electrode, the type of electrochemical cell (for example battery or fuel cell), the potential of the electrode, and the pH of the electrolyte of the electrochemical cell.

In a paste type electrode, the active electrode composition is first made into a paste. This may be done by first making the active electrode composition into a paste, and then applying the paste onto a conductive substrate. A paste may be formed by adding water and a "thickener" such as carboxymethyl cellulose (CMC) or hydroxypropylmethyl cellulose (HPMC) to the active composition. The paste would then be applied to the substrate. After the paste is applied to the substrate to form the electrode, the electrode may be sintered. The electrode may optionally be compressed prior to sintering.

To form the electrodes by compressing the powdered active electrode material onto the substrate, the active electrode material is first ground together to form a powder. The powdered active electrode material is then pressed or compacted onto a conductive substrate. After compressing the powdered active electrode material onto the substrate, the electrode may be sintered. To form the electrodes using ribbons of the active electrode material, the active electrode material is first is ground into a powder and placed into a roll mill. The roll mill preferably produces a ribbon of the active electrode material having a thickness ranging from 0.018 to 0.02 inches, however, ribbons with other thicknesses may be produced in accordance with the present invention. Once the ribbon of the active electrode material has been produced, the ribbon is placed onto a conductive substrate and rerolled in the roll mill to form the electrode. After being rerolled, the electrode may be sintered.

The electrode may be sintered in the range of 170 to 180° C. so as not to decompose the conductive polymer, as compared to sintering temperatures in the range of 310 to 330° C. if the conductive polymer is not utilized in the electrode.

EXAMPLE 1

A hybrid hydrogen-oxygen alkaline fuel cell in accordance with the present invention was constructed and tested. The hybrid hydrogen-oxygen alkaline fuel cell included a cathode, two anodes, and an auxiliary electrode. One of the anodes was constructed to operate with the cathode as a fuel cell and the other anode was constructed to operate with the auxiliary electrode as a battery.

The cathode for the hybrid hydrogen-oxygen alkaline fuel cell was prepared by first depositing the gas diffusion layer composed of 45 weight percent teflonated carbon (acetylene black Shawinigan AB) onto a current collector grid. Approximately 6–10 g of gas diffusion layer material was deposited onto the current collector grid per 100 $cm^2$. The active material layer composed of 20 weight percent teflonated carbon (Black Pearl 2000, trademark of Cabot Corp.) was then deposited onto the gas diffusion layer. Approximately 2–3 grams of active material layer material is deposited onto the gas diffusion layer per 100 cm². After depositing the gas diffusion layer, a second current collector grid is placed on top of the active material layer to complete the cathode. The cathode was hot pressed at a pressure of 0.3 tons per cm² for two minutes after the temperature was reached. The cathode was subsequently cooled to room temperature.

The active material layer of the cathode was then impregnated with an active catalyst material. The cathode was dipped into an aqueous solution of an active catalyst material precursor. The active catalyst material precursor was a 1M $AgNO_3$ solution preceded by a 10 percent by weight sugar solution dip as a reducing agent. Once submerged in the aqueous active catalyst material precursor solution, the solution was pulled into the active material layer under vacuum. The varying layers of hydrophobicity between the gas diffusion layer and the active material layer allowed the solution to penetrate into the pores within the active material layer and not penetrate into the gas diffusion layer. After removing the cathode from the active catalyst material solution, the cathode was dried at room temperature. The cathode was then heat treated at 50 degrees Celsius to remove any water from the electrode. The cathode was then heat treated at 300–375 degrees Celsius for half an hour to decompose any remaining nitrates into oxides. The cathode was then cooled and incorporated into the hybrid hydrogen-oxygen alkaline fuel cell.

The anode designed to operate with the cathode as a fuel cell included a gas diffusion layer and an active material layer. The gas diffusion layer was composed of 40% teflonated carbon rolled into a ribbon. The active material layer was prepared by forming a mixture composed of 88 weight percent Raney nickel, 8.0 weight percent teflon, and 4.0 weight percent graphite (Timcal KS 75). The mixture was then rolled into ribbons of active anode material. The active material layer ribbon and the gas diffusion layer ribbon were placed between two current collector grids and re-rolled to form the hydrogen electrode. The anode was sintered in nitrogen at 350° C. for half an hour then cooled to room temperature in a nitrogen environment.

The anode designed to operate with the auxiliary electrode also included a gas diffusion layer and an active material layer. The gas diffusion layer was prepared in the same manner as the gas diffusion layer for the anode designed to operate with the cathode. The active material layer, however, was formed from a mixture composed of 88 weight percent Misch metal, 8.0 weight percent teflon, and 4.0 weight percent graphite. The mixture was then rolled into ribbons of active anode material. The active material layer ribbon and the gas diffusion layer ribbon were placed between two current collector grids and re-rolled to form the hydrogen electrode. The anode was sintered in nitrogen at 350° C. for half an hour then cooled to room temperature in a nitrogen environment.

The auxiliary electrode was prepared by first forming a standard paste composed of 88.6 weight percent nickel hydroxide material with co-precipitated zinc and cobalt from Tanaka Chemical Company, 5.0 weight percent cobalt, 6.0 weight percent cobalt oxide, and 0.4 weight percent polyvinyl alcohol binder. The paste was then affixed to a current collector grid to form the auxiliary electrode.

Figure 5:
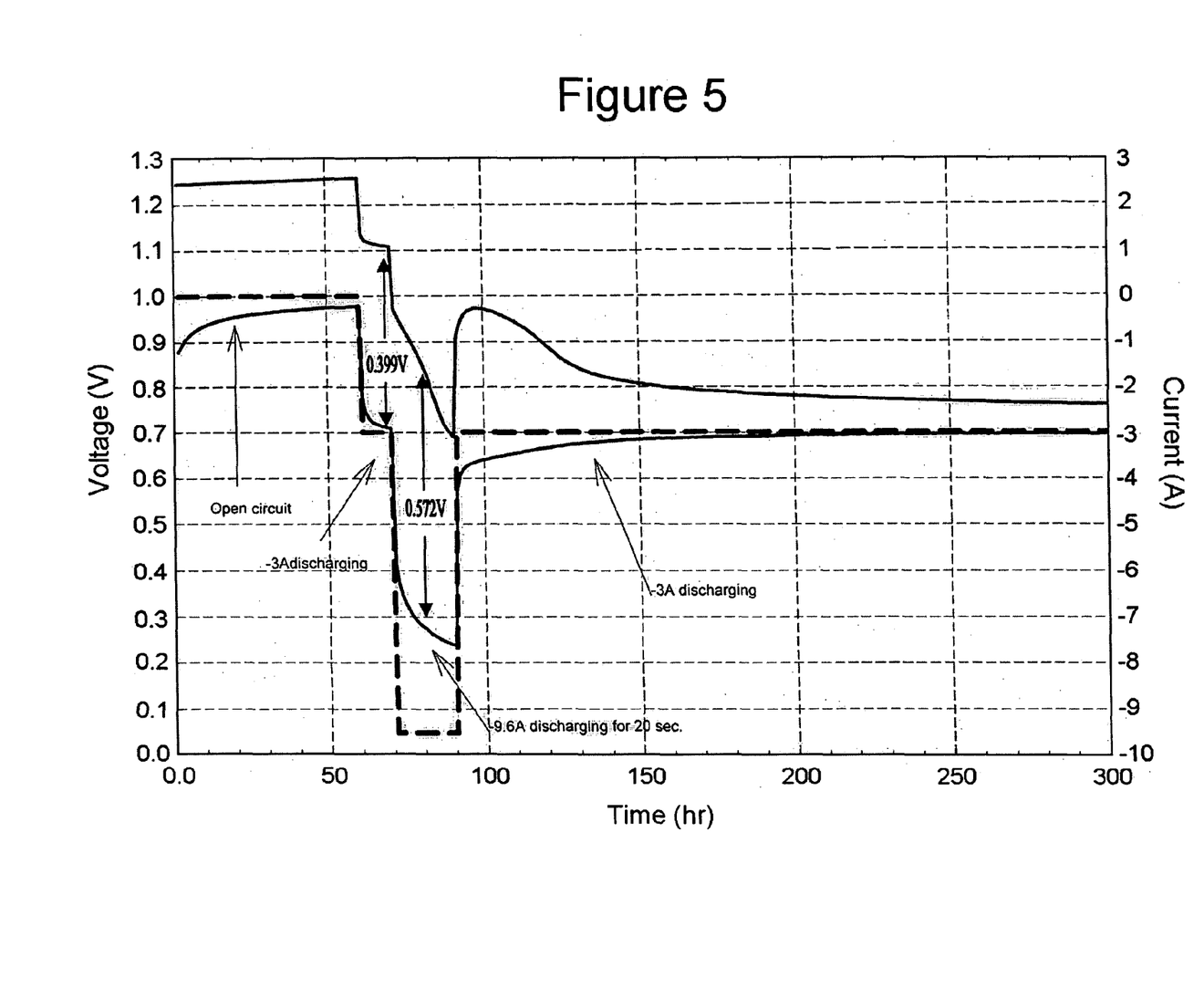
FIG. 5, shows the performance during fuel cell mode and hybrid mode of an embodiment of a hydrogen-oxygen hybrid fuel cell in accordance with the present invention.
Figure 6:
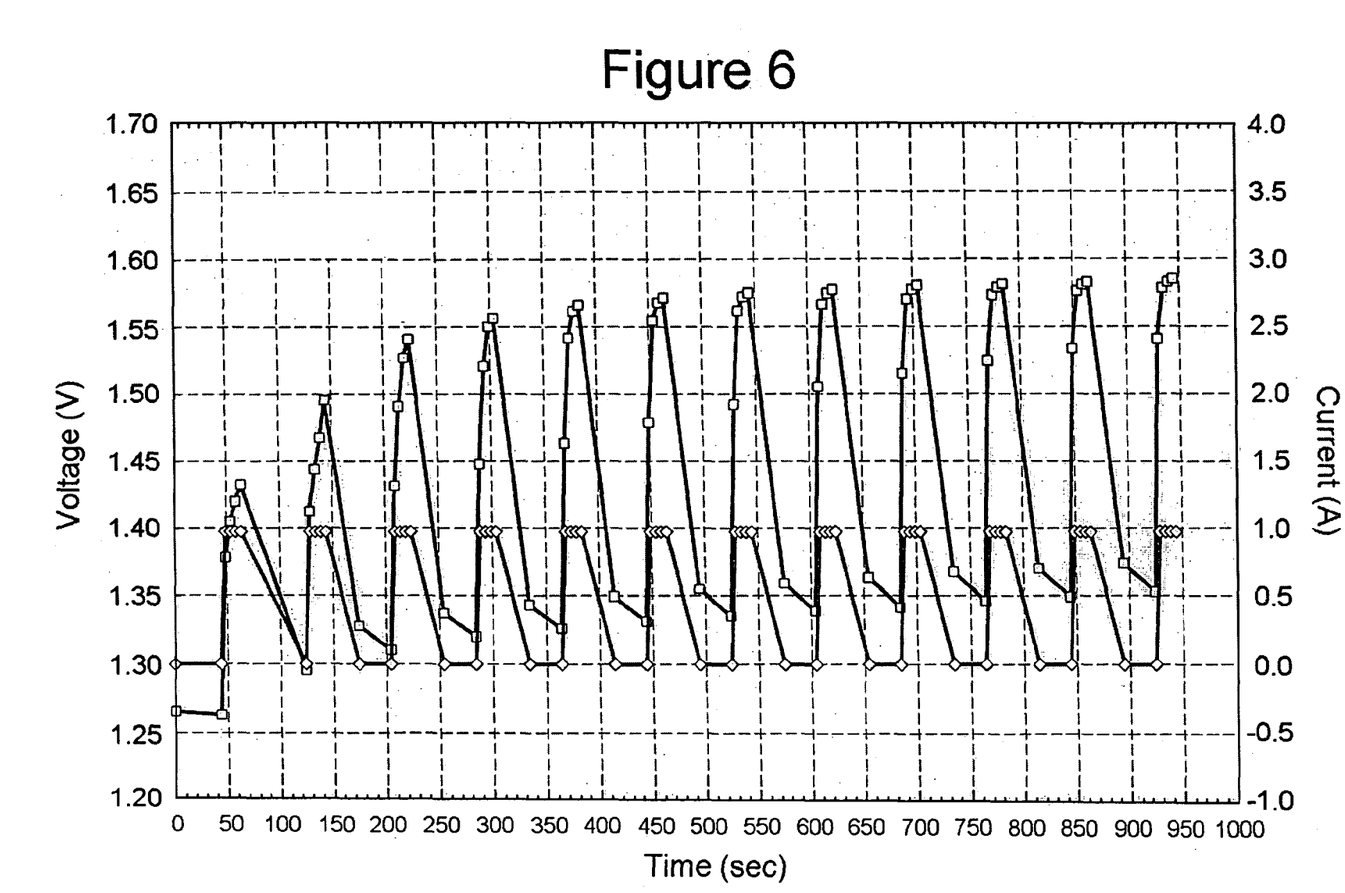
FIG. 6, shows the voltage of an embodiment of a hydrogen-oxygen hybrid fuel cell in accordance with the present invention upon accepting a charging current.

The hybrid hydrogen-oxygen alkaline fuel cell was tested under discharging conditions and tested for recharging capability. The results for the hybrid hydrogen-oxygen alkaline fuel air cell are shown in FIG. 5, FIG. 6, and below in Table 1. FIG. 5 shows the current (dashed line) and the voltage of the fuel cell only and the voltage of the fuel cell and battery together. The voltages were measured during a 3 A discharge and a 20 second pulse discharge of 9.6 A. The hybrid hydrogen-oxygen alkaline fuel cell achieved an increased voltage when both the cathode and the auxiliary electrode battery operated in tandem with the respective anodes as compared to the cathode operating alone with the respective anode. FIG. 6 shows voltage (□) of the hybrid fuel cell when a pulse current (◊) is applied to the cell. The voltage of the hybrid cell steadily increased upon receiving a series of 30 second 1 ampere pulse charges.

TABLE 1

| | At 10 sec. 3 A pulse discharging | At 10 sec. 9.6 A pulse discharging |
|---|---|---|
| Cathode Only | Cell voltage: 0.7095 V | Cell Voltage: 0.2759 V |
| Cathode and Auxiliary electrode | Cell Voltage: 1.1080 V | Cell Voltage: 0.8782 V |
| ΔV | 0.3985 V | 0.5723 V |
| Voltage % increase | 55.8% | 207% |

EXAMPLE 2

A hybrid metal air fuel cell in accordance with the present invention was constructed and tested. The hybrid metal-air fuel cell included a cathode, an anode, and an auxiliary electrode. The anode was designed to operate with the cathode as a fuel cell and operate with the auxiliary electrode as an battery.

The cathode for the hybrid metal-air fuel cell was prepared by first depositing the gas diffusion layer composed of 60 weight percent teflonated carbon (Vulcan XC-72) onto a current collector grid. Approximately 6–10 g of gas diffusion layer material was deposited onto the current collector grid per 100 cm². The active material layer composed of 20 weight percent teflonated carbon was then deposited onto the gas diffusion layer. Approximately 2–3 grams of active material layer material is deposited onto the gas diffusion layer per 100 cm². After depositing the gas diffusion layer, a second current collector grid is placed on top of the active material layer to complete the cathode. The cathode was then hot pressed at a pressure of 0.3 tons per cm² and subsequently cooled to room temperature.

The active material layer of the cathode was then impregnated with an active catalyst material. The cathode was dipped into an aqueous solution of an active catalyst material precursor. The active catalyst material precursor was a 1M $AgNO_3$ solution containing 10% by weight sugar as a reducing agent. Once submerged in the aqueous active catalyst material precursor solution, the solution was pulled into the active material layer under vacuum. The varying layers of hydrophobicity between the gas diffusion layer and the active material layer allowed the solution to penetrate into the pores within the active material layer and not penetrate into the gas diffusion layer. After removing the cathode from the active catalyst material solution, the cathode was dried at room temperature. The cathode was then heat treated at 50 degrees Celsius to remove any water from the electrode. The cathode was then heat treated at 300–375 degrees Celsius for half an hour to decompose any remaining nitrates into oxides. The cathode was then cooled and incorporated into the hybrid metal-air fuel cell.

The anode for the hybrid metal-air fuel cell was prepared by forming a mixture composed of 98.7 weight percent Zinc powder, 1.0 weight percent teflon, and 0.3 weight percent carboxymethyl cellulose and then mixed to form a paste. The paste was then applied onto nickel foam, dried and a final roll compaction to the desired electrode thickness of 0.02 inches.

The auxiliary electrode was prepared by first forming a standard paste composed of 88.6 weight percent nickel hydroxide material with co-precipitated zinc and cobalt from Tanaka Chemical Company, 5.0 weight percent cobalt, 6.0 weight percent cobalt oxide, and 0.4 weight percent polyvinyl alcohol binder. The paste was then affixed to a current collector grid to form the auxiliary electrode.

Figure 7:
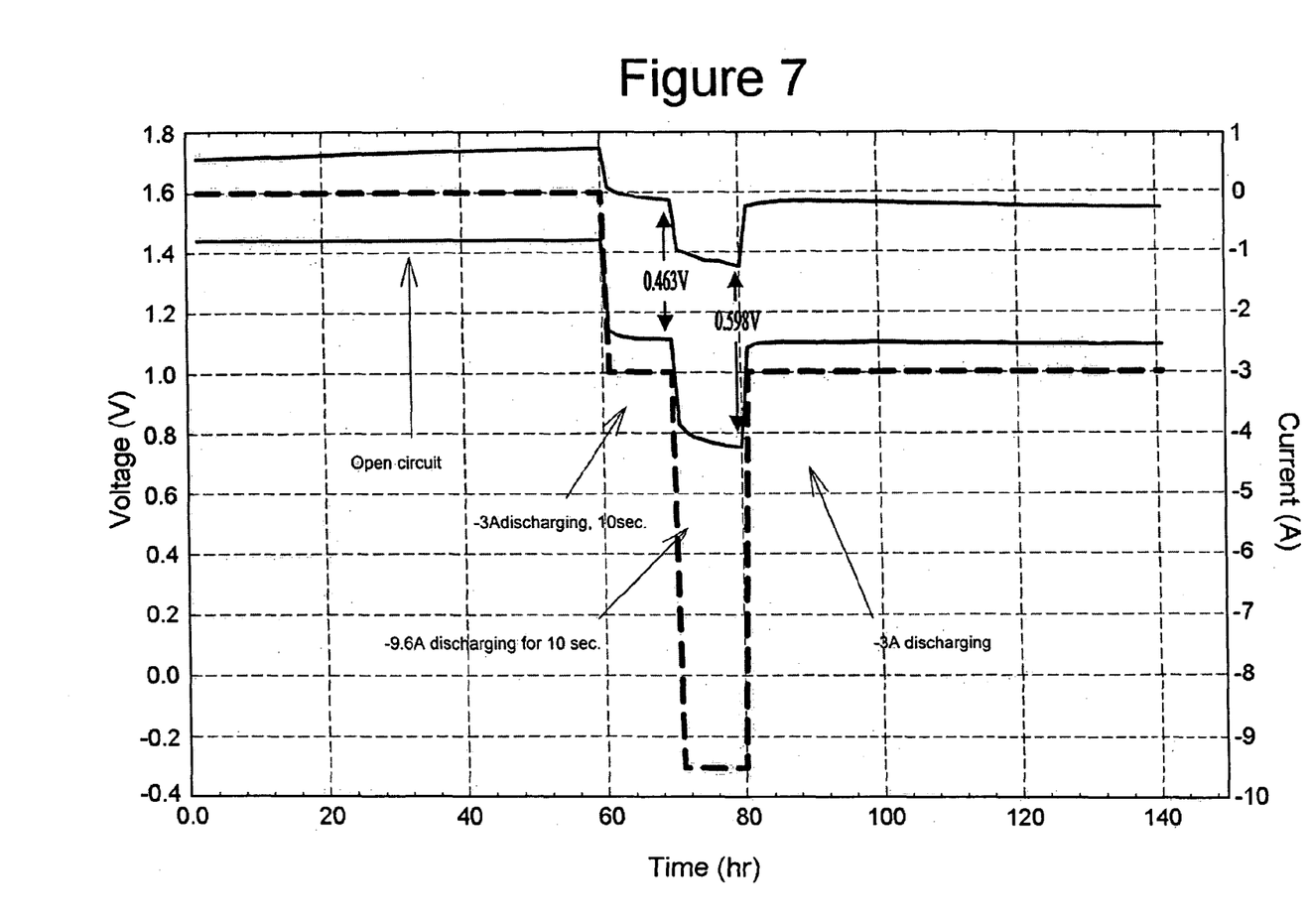
FIG. 7, shows the performance during fuel cell mode and hybrid mode of an embodiment of a metal-air hybrid fuel cell in accordance with the present invention.

The hybrid metal air cell was tested under discharging conditions. The results for the hybrid metal air fuel cell are shown in FIG. 7 and below in Table 2. FIG. 7 shows the current (dashed line) and the voltage of the fuel cell only and the voltage of the fuel cell and battery together. The voltages were measured during a 3 A discharge and a 20 second pulse discharge of 9.6 A. The hybrid metal air cell achieved an increased voltage when both the cathode and the auxiliary electrode battery operated in tandem with the anode as compared to the cathode operating alone with the anode.

TABLE 2

| | At 10 sec. 3 A pulse discharging | At 10 sec. 9.6 A pulse discharging |
|---|---|---|
| Cathode Only | Cell voltage: 1.1096 V | Cell Voltage: 0.7531 V |
| Cathode and Auxiliary electrode | Cell Voltage: 1.5725 V | Cell Voltage: 1.3507 V |
| ΔV | 0.4629 V | 0.5976 V |
| Voltage % increase | 41.7% | 79.4% |

The foregoing is provided for purposes of explaining and disclosing preferred embodiments of the present invention. Modifications and adaptations to the described embodiments, particularly involving changes to the shape of the fuel cell and components thereof and varying electrode compositions will be apparent to those skilled in the art. These changes and others may be made without departing from the scope or spirit of the invention in the following claims.

The invention claimed is:

1. A hybrid fuel cell comprising:
a fuel cell portion; and
a rechargeable battery portion;
said fuel cell portion and said rechargeable battery portion operating alone or in tandem;
said fuel cell portion and said rechargeable battery portion sharing at least one reactant.

2. The hybrid fuel cell according to claim 1, wherein said hybrid fuel cell further comprises an anode section including one or more anodes disposed between said fuel cell portion and said rechargeable battery portion.

3. The hybrid fuel cell according to claim 2, wherein said anode section is shared between said fuel cell portion and said rechargeable battery portion.

4. The hybrid fuel cell according to claim 2, wherein said anode comprises an anode active material, said anode active material including zinc, cadmium, magnesium, or aluminum.

5. The hybrid fuel cell according to claim 4, wherein said anode comprises 90 to 99 weight percent of said anode active material and 1 to 10 weight percent of a binder material.

6. The hybrid fuel cell according to claim 2, wherein said anode comprises a hydrogen storage material and/or Raney nickel.

7. The hybrid fuel cell according to claim 6, wherein said anode comprises 0.0 to 88.0 weight percent of said hydrogen storage material, 0.0 to 88.0 weight percent Raney nickel, 4.0 to 12.0 weight percent of a binder material, and 0.0 to 5.0 weight percent of a conductive material.

8. The hybrid fuel cell according to claim 7, wherein said conductive material comprises graphite or graphitized carbon.

9. The hybrid fuel cell according to claim 7, wherein said hydrogen storage material comprises Rare-earth metal alloys, Misch metal alloys, zirconium alloys, titanium alloys, magnesium/nickel alloys, or mixtures thereof.

10. The hybrid fuel cell according to claim 2, wherein said fuel cell portion comprises at least one cathode, said cathode being in electrical communication with said anode.

11. The hybrid fuel cell according to claim 10, wherein said cathode comprises a carbon matrix with an active catalyst material catalytic toward the dissociation of molecular oxygen dispersed therein.

12. The hybrid fuel cell according to claim 11, wherein said active catalyst material is selected from silver, silver alloys, silver oxide, cobalt, cobalt oxide, cobalt manganese oxide, nickel, manganese oxide, manganese dioxide, pyrolyzed macrocyclics, or combinations thereof.

13. The hybrid fuel cell according to claim 11, wherein said cathode further comprises a peroxide decomposing material.

14. The hybrid fuel cell according to claim 2, wherein said rechargeable battery portion comprises at least one auxiliary electrode, said auxiliary electrode being in electrical communication with said anode.

15. The hybrid fuel cell according to claim 14, wherein said auxiliary electrode comprises a positive electrode material.

16. The hybrid fuel cell according to claim 15, wherein said auxiliary electrode is a nickel electrode.

17. The hybrid fuel cell according to claim 15, wherein said auxiliary electrode is a silver electrode.

18. The hybrid fuel cell according to claim 15, wherein said positive electrode material comprises 75 to 85 weight percent of a positive electrode active material, 0.0 to 10 weight percent cobalt, 0.0 to 10 weight percent cobalt oxide, and 0.0 to 4.0 weight percent of a binder material.

19. The hybrid fuel cell according to claim 18, wherein said positive electrode active material is selected from nickel hydroxide/nickel oxyhydroxide, copper oxide, silver oxide, manganese dioxide, or combinations thereof.

20. The hybrid fuel cell according to claim 1, wherein said rechargeable battery portion is adapted to accept an electrical current from a source of power external to said hybrid fuel cell.

21. The hybrid fuel cell according to claim 1, wherein said rechargeable battery portion is adapted to accept an electrical current produced by said fuel cell portion.

22. The hybrid fuel cell according to claim 1, wherein said fuel cell portion and said rechargeable battery portion share an electrolyte.

23. The hybrid fuel cell according to claim 1, wherein said at least one reactant is selected from oxygen, hydrogen, zinc, aluminum, cadmium, and magnesium.

* * * * *